(12) United States Patent
Stecker et al.

(10) Patent No.: US 9,507,049 B2
(45) Date of Patent: Nov. 29, 2016

(54) OBJECT SENSING USING DYNAMIC DEMODULATION

(71) Applicant: Banner Engineering Corporation, Minneapolis, MN (US)

(72) Inventors: John Alyn Stecker, Maple Lake, MN (US); Keith Donald Carlsten, Long Lake, MN (US); David Steven Anderson, Plymouth, MN (US)

(73) Assignee: BANNER ENGINEERING, Minneapolis, MN (US)

( * ) Notice: Subject to any disclaimer, the term of this patent is extended or adjusted under 35 U.S.C. 154(b) by 163 days.

(21) Appl. No.: 14/045,985

(22) Filed: Oct. 4, 2013

(65) Prior Publication Data
US 2015/0098087 A1    Apr. 9, 2015

(51) Int. Cl.
*G01V 8/10* (2006.01)

(52) U.S. Cl.
CPC ....................................... *G01V 8/10* (2013.01)

(58) Field of Classification Search
CPC ........................................................ G06F 3/044
USPC ................................. 250/221; 345/173–178
See application file for complete search history.

(56) References Cited

U.S. PATENT DOCUMENTS

| | | | |
|---|---|---|---|
| 3,557,373 A | 1/1971 | Hess | |
| 3,999,060 A | 12/1976 | Skagerlund | |
| 4,047,023 A | 9/1977 | Key et al. | |
| 4,840,069 A | 6/1989 | Hampton et al. | |
| 5,008,532 A | 4/1991 | Ono et al. | |
| 5,141,304 A | 8/1992 | Icihashi | |
| 5,281,810 A | 1/1994 | Fooks et al. | |

(Continued)

FOREIGN PATENT DOCUMENTS

| | | |
|---|---|---|
| EP | 0 346 878 A2 | 12/1989 |
| GB | 2 301 468 A | 4/1996 |
| JP | 2002171162 A | 6/2002 |
| JP | 2007124373 A | 5/2007 |

(Continued)

OTHER PUBLICATIONS

Sang-Hwa Yi et al., A Novel Complex Algorithm for Denoising Partial Discharge Signal, 2008 International Conference on Condition Monitoring and Diagnosis, Beijing, China, Apr. 21-24, 2008 (4 pages).

(Continued)

*Primary Examiner* — Renee Chavez
(74) *Attorney, Agent, or Firm* — Merchant & Gould P.C.

(57) ABSTRACT

An object detection method comprises transmitting a plurality of signals from a transmitter into a region; measuring a plurality of signals, each corresponding to a respective one of the plurality of the transmitted signals, received by a sensor; determining whether each of the plurality of received signals satisfies a condition (such as that a received signal is above a threshold level for indicating that an object is located in the region, or below a threshold level for indicating that an object is not located in the region); determining whether noise of at least a threshold amount is present; and determining whether an object is located within the region depending on whether at least a number of received signals meet the condition, the number being different when noise of at least a threshold amount is determined to be present than not present. For example, the required number of received signals that meet the condition when noise is present can be higher than when noise is absent. A device for detecting object according to the method is also disclosed.

19 Claims, 9 Drawing Sheets

(56) References Cited

U.S. PATENT DOCUMENTS

| | | |
|---|---|---|
| 5,324,931 A | 6/1994 | Fooks et al. |
| 5,336,882 A | 8/1994 | Fooks et al. |
| 5,347,117 A | 9/1994 | Fooks et al. |
| 5,475,727 A | 12/1995 | Bucanan et al. |
| 5,479,207 A | 12/1995 | Degi et al. |
| 5,491,330 A | 2/1996 | Sato et al. |
| 5,496,996 A | 3/1996 | Barnes et al. |
| 5,698,845 A | 12/1997 | Kodama et al. |
| 5,712,475 A | 1/1998 | Ohno |
| 5,969,340 A | 10/1999 | Dragne et al. |
| 6,201,236 B1 | 3/2001 | Juds |
| 6,215,115 B1 | 4/2001 | Baker |
| 6,683,290 B2 | 1/2004 | Doherty |
| 6,720,545 B2 | 4/2004 | Mizuhara et al. |
| 6,927,385 B2 | 8/2005 | Adamietz et al. |
| 7,071,452 B2 | 7/2006 | Warner et al. |
| 7,309,852 B2 | 12/2007 | Yeo et al. |
| 7,620,330 B2 | 11/2009 | Faska et al. |
| 7,822,349 B2 | 10/2010 | Roosli et al. |
| 8,258,453 B2 | 9/2012 | Rees |
| 2005/0001149 A1 | 1/2005 | Beuschel |
| 2011/0285654 A1* | 11/2011 | Park et al. .......... 345/173 |

FOREIGN PATENT DOCUMENTS

| | | |
|---|---|---|
| JP | 2008298653 A | 12/2008 |
| JP | 2008298655 A | 12/2008 |
| JP | 2010217003 A | 9/2010 |

OTHER PUBLICATIONS

Yong Cao, et al., Design of Low-noise Photoelectric Detection circuit with Anti-saturation Interference, 2012 International Conference on Computer Science and Electronics Engineering, (pp. 231-233).

IBM TDB, Increasing Time Resolution of Electron Beam and Photo-Electric Sampling, IP.com Prior Art Database, Mar. 1, 1988, (3 pages).

IBM TDB, Glitchless Encoder Interface, IP.com Prior Art Database, Aug. 1, 1985, (3 pages).

IBM TDB, Biased Photocell Amplifier, IP.com Prior Art Database, Feb. 1, 1968, (3 pages).

Dongtang Ma et al., A Novel Optical Signal Detecting and Processing Method for Swarm Robot Vision System, Proceedings of the 2003 IEEE International Conference on Robotics, Intelligent Systems and Signal Processing, Changsha, China, Oct. 2003, (5 pages).

* cited by examiner

OBJECT SENSING USING DYNAMIC DEMODULATION

INTRODUCTION

This disclosure generally relates to detecting objects in monitored regions, and more particularly relates to methods and devices for detecting objects in environments where interfering signals, or noise, may be present.

Sensors, such as optical sensors, have been used to automatically monitor the presence of objects in certain defined regions for applications such as industrial safety and automation. In one example type of application, an optical device has a transmitter that emits pulsed light signals into a monitored region and a sensor that detects signals resulting from the interaction, such as reflection or scattering, between the transmitted light signals and any object located in the region. When an object is located in the monitored region, light signals above a threshold level may be detected as a result of transmitted light being reflected or scattered into the sensor. However, when light signals above a threshold is detected, the detected signals may be from noise sources, such as neighboring transmitters or lighting sources, rather than an object located in the monitored region. Various methods and devices have been used to reduce the chances of false assessment, e.g., determining that an object is in a monitored region when it is not, due to noise.

SUMMARY

This disclosure relates to methods and devices for detecting objects in a region. In one aspect, an object detection method comprises transmitting a plurality of signals, such as optical signals, from a transmitter into a region; measuring a plurality of signals, each corresponding to a respective one of the plurality of the transmitted signals, received by a sensor; determining whether each of the plurality of received signals satisfies a condition; determining whether noise of at least a threshold amount is present; and determining whether an object is located within the region depending on whether at least a number of received signals meet the condition, the number being different when noise of at least a threshold amount is determined to be present than not present.

The transmitted signals can be transmitted sequentially during a plurality of repetition time intervals, and the signals received by the sensor can be measured during each repetition time intervals and during a signal measuring time interval beginning at or after the onset of each transmitted signal. The condition may be, for example, that the received signal is above a threshold level for indicating that an object is located in the region, or below a threshold level for indicating that an object is not located in the region. Noise can be measured during a noise measurement time interval in one or more of the repetition time intervals by measuring the signals received by a sensor, which can be the same sensor described above for measuring signals during the signal measurement time interval. A determination that noise of at least a threshold amount is present can be made, for example, when signals above a noise threshold level is detected during one or more noise measurement time intervals.

A determination that an object is located in the monitored region can be made, for example, if the signals measured during the signal measurement periods are above the threshold for a predetermined number of consecutive repetition time intervals. When noise of at least a threshold amount is determined to be present, a higher predetermined number of consecutive repetition time intervals is used to determine that an object is located in the monitored region.

Once a determination that an object is located in the monitored region is made, the signals measured during the signal measurement time intervals must be lower than a threshold level in a predetermined number of repetition time intervals (consecutive or a minimum fraction of a total number of intervals) before a determination is made that an object is not located in the monitored region. The predetermined number is decreased when noise of at least a threshold amount is determined to be present.

In another aspect of this disclosure, a device for detecting an object in a region comprises a transmitter, a sensor for detecting signals from the monitored region during the signal measurement time intervals, a noise detector and a controller. The controller is adapted to operate the transmitter to transmit signal, operate the sensor to measure the received signals and operate the noise sensor to measure noise. The controller is configured and adapted to determine whether an object is located in a region as described above.

DETAILED DESCRIPTION

Machine sensing finds a wide range of applications. Devices for automatically detecting the presence of objects in a monitored region, for example, are used in applications such as industrial safety and automation. For such applications, it is desirable to quickly and accurately determine whether an object is present in a monitored region.

In one example application, an object detection device includes an optical emitter (or transmitter) and receiver (or sensor), which may be contained in the same housing (i.e., the device may be self-contained). The emitter emits a train of pulsed light signals and the device measures the signals received by the sensor to detect light reflected or scattered back from an object in the monitored region in order to determine if there is an object present.

To attain a desired degree of reliability of object detection, a process sometimes referred to as "demodulation" is used. In such a process, the signals received by the sensor are measured repeatedly and the measured signals must meet a certain requirement (such as being above or below a threshold level) a minimum number of times before the device determines whether an object is present in the monitored region. For example, a requirement can be that the sensor must receive signals above a particular threshold level for a number (sometimes referred to as "demodulation count") (e.g., four) consecutive repetition time intervals (sometimes referred to as "rep-rates") for the device to determine that an object is present in the monitored region and to change the state of an object-presence indicator from the "dark" state to the "light" state. Here, "light" state means the device has determined that an object is present in the monitored region (and the measure signals resulted from the transmitted signals being reflected or scattered by the object); and "dark" state means no object is present in the monitored region.

Conversely, for an object detecting device to change from a "light" state to a "dark" state, there must be no light (or no light above a threshold level) returned for, e.g., four (4) rep-rates.

However, even with demodulation, chances for false detection exist when noise is present. Measured signals may reach levels above threshold due to noise, including interfering light pulses from other nearby sensor devices and environmental noises such as light from building lighting fixtures. Objects may thus be determined to be present in a monitored region when they are not. A fixed demodulation count can be used to reduce the error rate due to noise, but it also slows down the detection process, often unnecessarily when noise level is low.

Example methods and devices disclosed in the present disclosure provide dynamic demodulation, i.e., using a demodulation count that is dependent on the detected noise level, to achieve a high level of reliability while maintaining a high rate of object detection. In certain examples, a lower demodulation count is used when noise level is determined to be below a threshold level, and a higher demodulation count is used when the noise level is determined to be at or above the threshold level.

Figure 1A:
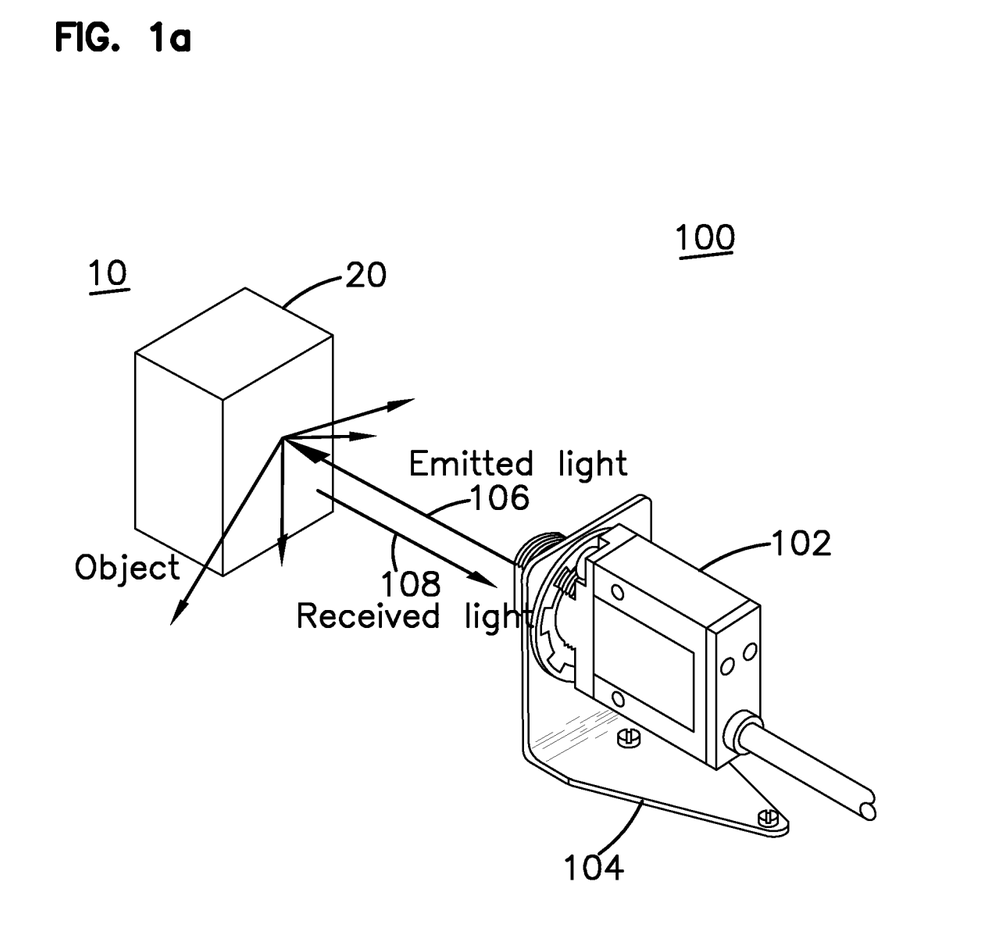
FIG. 1a schematically shows an object detecting device and its operating environment according to one aspect of this disclosure.
Figure 1B:
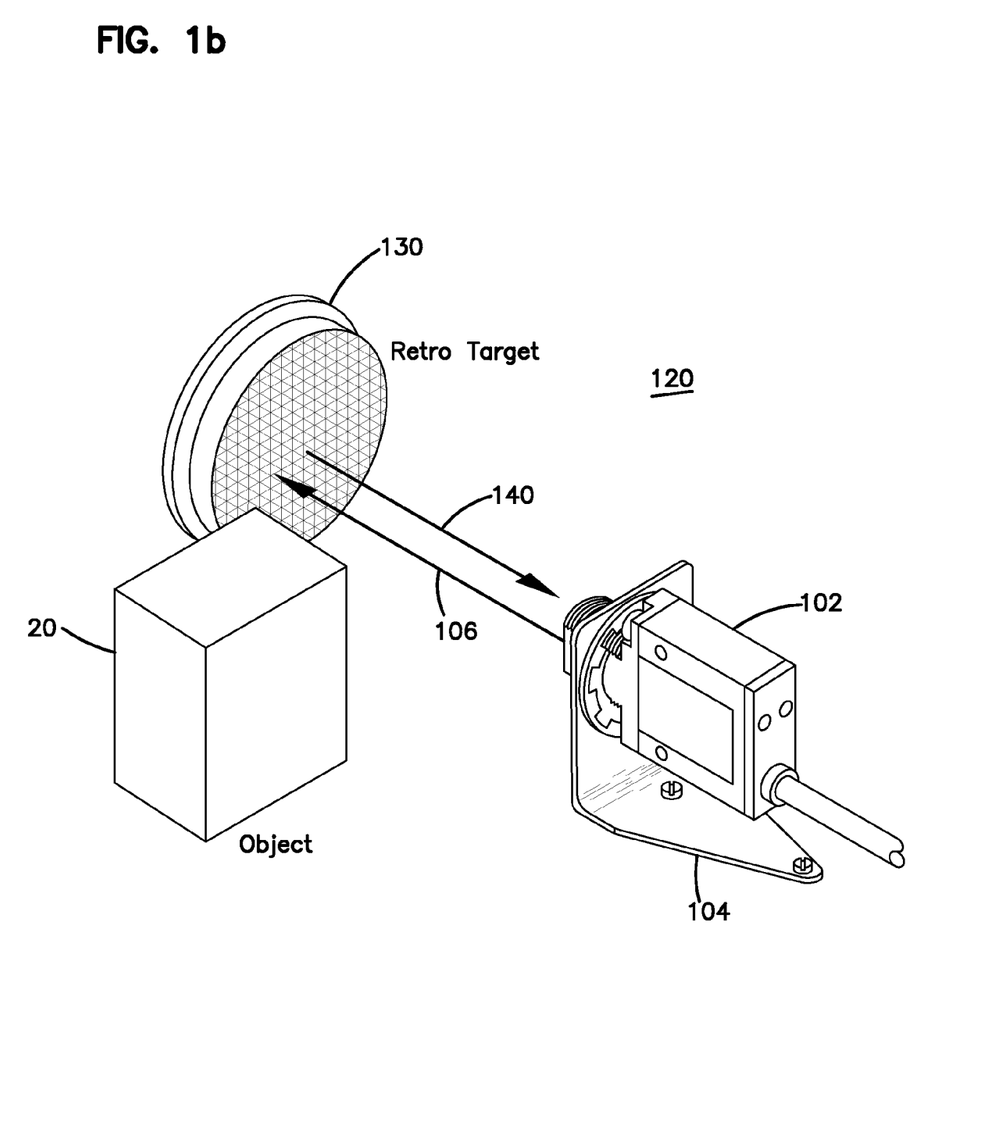
FIG. 1b schematically shows an object detecting device and its operating environment according to another aspect of this disclosure.

As an example, referring to FIG. 1a, in a diffuse mode, an object detecting device 100, which can be an optical detector, includes an optical transmitter (not explicitly shown) disposed in the housing 102, which is mounted on a support 104, for transmitting pulsed light 106 to a monitored region 10. If an object 20 is present in the monitored region 10, the object 20 interacts with the transmitted light 106, and at least a portion of the product of that interaction, such as scattered or reflected light 108, can be received by a sensor (not explicitly shown), which can also be disposed in the housing 102, in the device 100. In another example, depicted in FIG. 1b, in a retro- or polarized retro mode, the object detecting device 120 transmits a signal 106 to a retro target 130 and receives a reflected signal 140 when no object is present in the monitored region. When an object enters the monitored region, the transmitted signal 106 and/or reflected signal 140 are blocked by the object 20, and the sensor in device 120 does not receive any signal reflected by the retro target 130.

An electronic controller (not explicitly shown), which can reside inside, partially inside or outside the housing 102, controls the transmission of the transmitted light 106 and measures the signals received by the sensor and makes determinations characterizing the signals and noise received by the sensor, and on whether an object is present in the monitored region 10 based on the signals and noise received.

Figure 2:
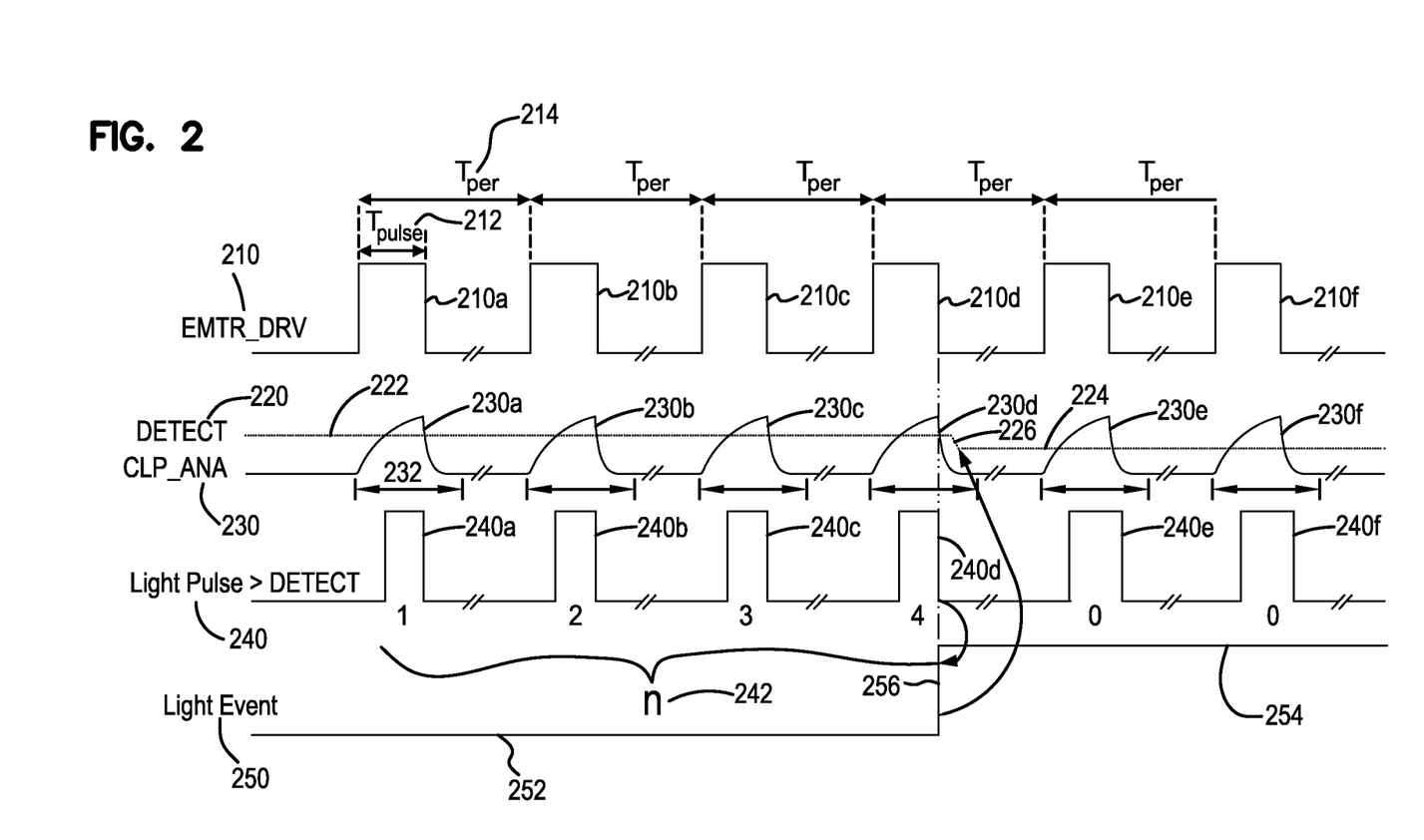
FIG. 2 schematically shows the various signals leading to a determination that an object is located in a monitored region according to an aspect of the disclosure.

For example, as illustrated in FIG. 2, in an example method for determining, a transmitter (or emitter) is driven to transmit a signal 210 comprising a sequential series of light pulses 210a-f, each having a pulse width, $T_{pulse}$ 212, and transmitted during a repetition time interval, $T_{per}$, 214. For each transmitted pulse 210a-f, the signal received by the sensor is measured during a signal measurement time interval 232, which can begin, for example, at or after the onset of each transmitted pulse 210a-f. See, also, FIG. 5. The measured signals 230a-f are compared with an object detection threshold level 220. If a measured signal exceeds the threshold level 220, a condition consistent with detecting reflection of a transmitted signal by an object in the monitored region is determined to be met, as indicated by a change of state in a light-pulse-detect signal 240, e.g., one of light-pulse-detect pulses 240a-f. Upon detecting a certain number, n (242), of light-pulse-detect pulses in a certain number of repetition time intervals, an object is determined to be present in the monitored region, as indicated by a change of state in a "light-event" signal 250. In the example shown in FIG. 2, if light-pulse-detect signals are detected in four (n=4) consecutive repetition time intervals 214, the light-event signal 250 changes from a first state 252 to a second state 254.

The example in FIG. 2 illustrates a time sequence that begins with the detection device in a "dark" state (corresponding to the first signal level 252 of the light-event signal 250), i.e., where no object was determined to be present in the monitored region, and the device is configured to detect when the monitored region becomes occupied by an object. In the "dark" state, the object detection threshold level 220 is set at a higher value 222. Upon determining that an object is present in the monitored region, the device switches to a "light" state (corresponding to the second signal level 254 of the light-event signal 250). Upon transition from a "dark" state to a "light" state (or transition point 256 in the light-event signal 250), the threshold level transitions (226) to a lower level 224. The device becomes configured to determine when the monitored region becomes empty.

Figure 3:
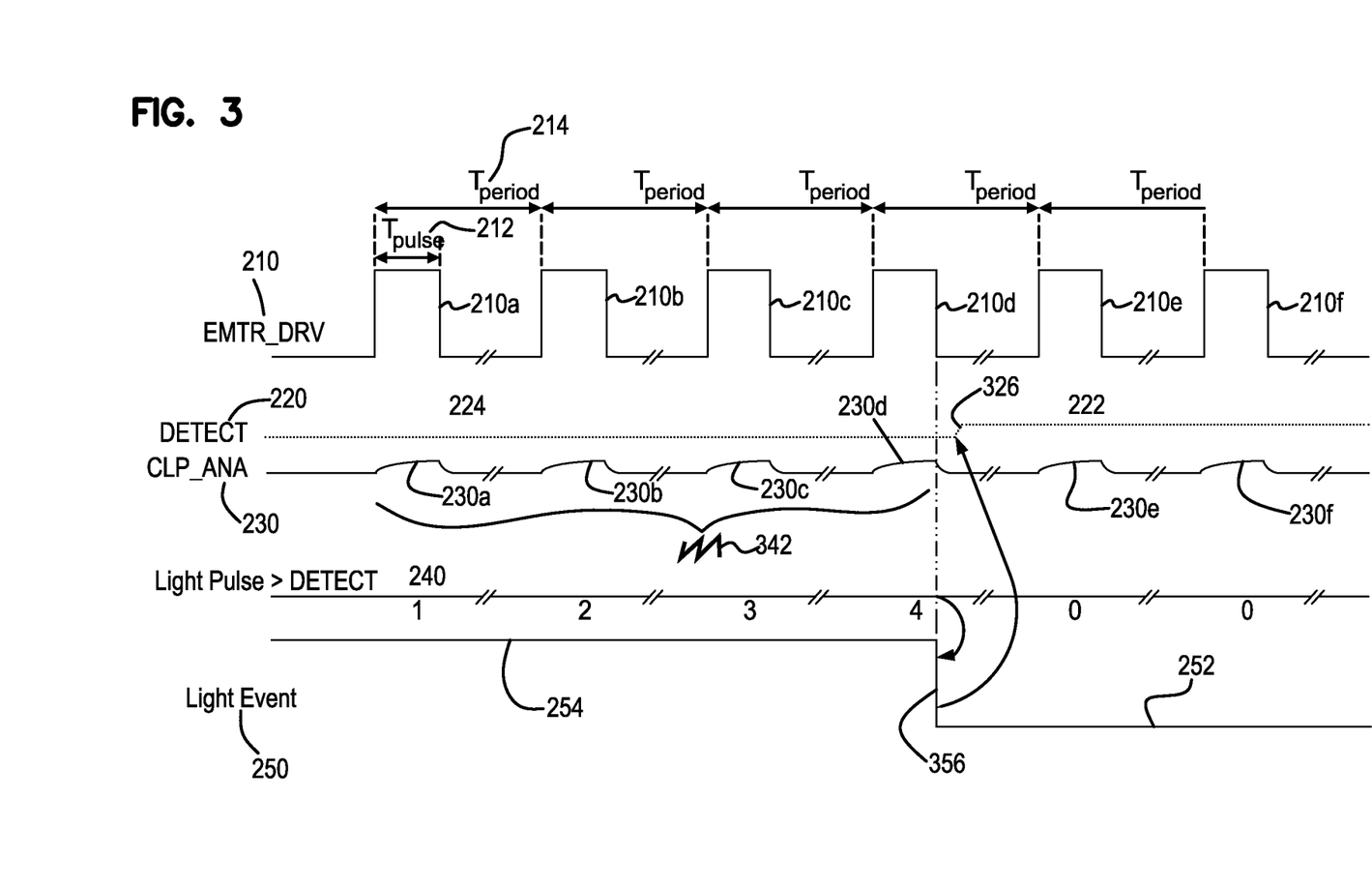
FIG. 3 schematically shows the various signals leading to a determination that an object is not located in a monitored region according to an aspect of the disclosure.

An example of light-to-dark transition, i.e., a process for determining that the monitored region is no longer occupied, is illustrated in FIG. 3. Here, the signal 230 received by the sensor is compared with the lower threshold level 224, and if the signal 230 is below the threshold level 224, the light-pulse-detect signal does not change state (e.g., remains low). Upon determining that a certain number, m (342), of light-pulse-detect pulses in a certain number of repetition time intervals are low, or have undergone no change of state, an object is determined to be not present in the monitored region, as indicated by a change of state in the "light-event" signal 250, from the second state 254 to the first state 252. In the example shown in FIG. 3, if light-pulse-detect signals are "low" in four (m=4) consecutive repetition time intervals 214, the light-event signal 250 changes from second state 254 to the first state 252, and the detection device 100 switches to the "dark" state. The object detection threshold level 220 is switched (326) to the higher level 222, and the device becomes configured to determine when the monitored region becomes occupied.

Figure 4:
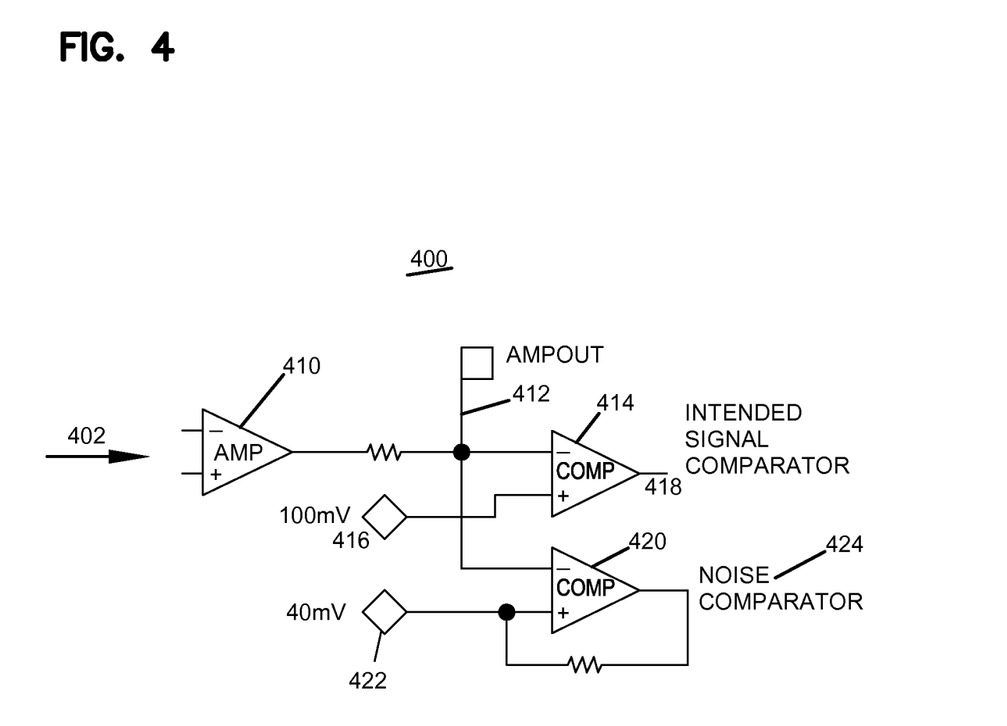
FIG. 4 schematically shows a portion of a device for detecting an object in a monitored region according to an aspect of the disclosure.

According to another aspect of the disclosure, noise received by the sensor is also measured during at least one repetition time interval 214. The noise can be measured from the same sensor that is used to detect the reflected signal during the signal measurement time interval 232, or it can be measured indirectly from a different sensor the output which bears a known relationship to the sensor for reflected signal. In one example, as illustrated in FIG. 4, a signal evaluation circuit 400 is used to measure both reflected signals and noise from the same sensor. The output 402 of the sensor is received into an amplifier 410, the output 412 of which is fed to two voltage comparators 414, 420. The first comparator 414, which is referred to in this disclosure also as an "intended signal comparator," compares the amplified signal 412 to an object detection reference voltage 416, which corresponds to the object detection threshold level 220; the second comparator 420, which is referred to in this disclosure also as a "noise comparator," compares the amplified signal 412 to a noise reference voltage 422, which corresponds to a noise threshold level. The intended signal comparator 414 generates an output 418 that is indicative of whether the measured signal is above the object detection threshold level; the noise comparator 420 generates an output 424 that is indicative of whether the measured signal is above the noise threshold level. The noise threshold level is typically lower than the object detection threshold level. For example, the object detection reference voltage 416 can be 100 mV (corresponding to the higher object detection threshold level 222) when the object detection device 100 is in the "dark" state and 75 mV (corresponding to the lower object detection threshold level 224) when the object detection device 100 is in the "light" state); the noise threshold reference voltage 422 can be 40 mV.

The outputs 418, 424 or both comparators 414, 420 are received by a controller (not explicitly shown), which can be microprocessor-based, for further processing to determine whether an object is present in the monitored region. The controller can also operate one or more of the transmitter, sensor and the comparators, including controlling the timing of optical pulse transmission and the signal and noise measurement time intervals.

Figure 5:
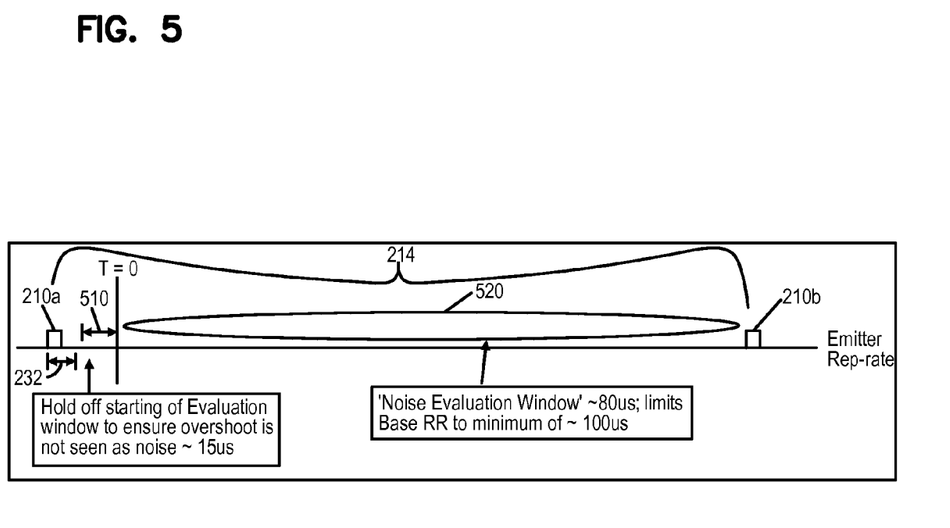
FIG. 5 schematically shows the time intervals for the various steps in a method for detecting an object according to an aspect of the disclosure.

As illustrated in FIG. 5, noise can be measured in a noise measurement time interval (or "noise evaluation window") 520 within one or more repetition time intervals 214. The noise measurement time interval 520 can begin after the signal measurement time interval 232, preferably with an intervening period 510 to allow any remaining signal left over from the signal measurement time interval 232 to settle.

Noise can be determined to be present according to any suitable criterion. For example, noise can be deemed present during a noise measurement time interval 520 if the measured signal is above the noise threshold level for at least a predefined cumulative length of time. Alternatively, noise can be deemed present during a noise measurement time interval 520 if the measured signal reaches above the noise threshold level a predefined number of times or more. Alternatively, as used in the example processes described below, noise can be determined to be present if the measured signal crosses (either increasing to above from below or decreases to below from above) the noise threshold level a predefined number of times.

Figure 6:
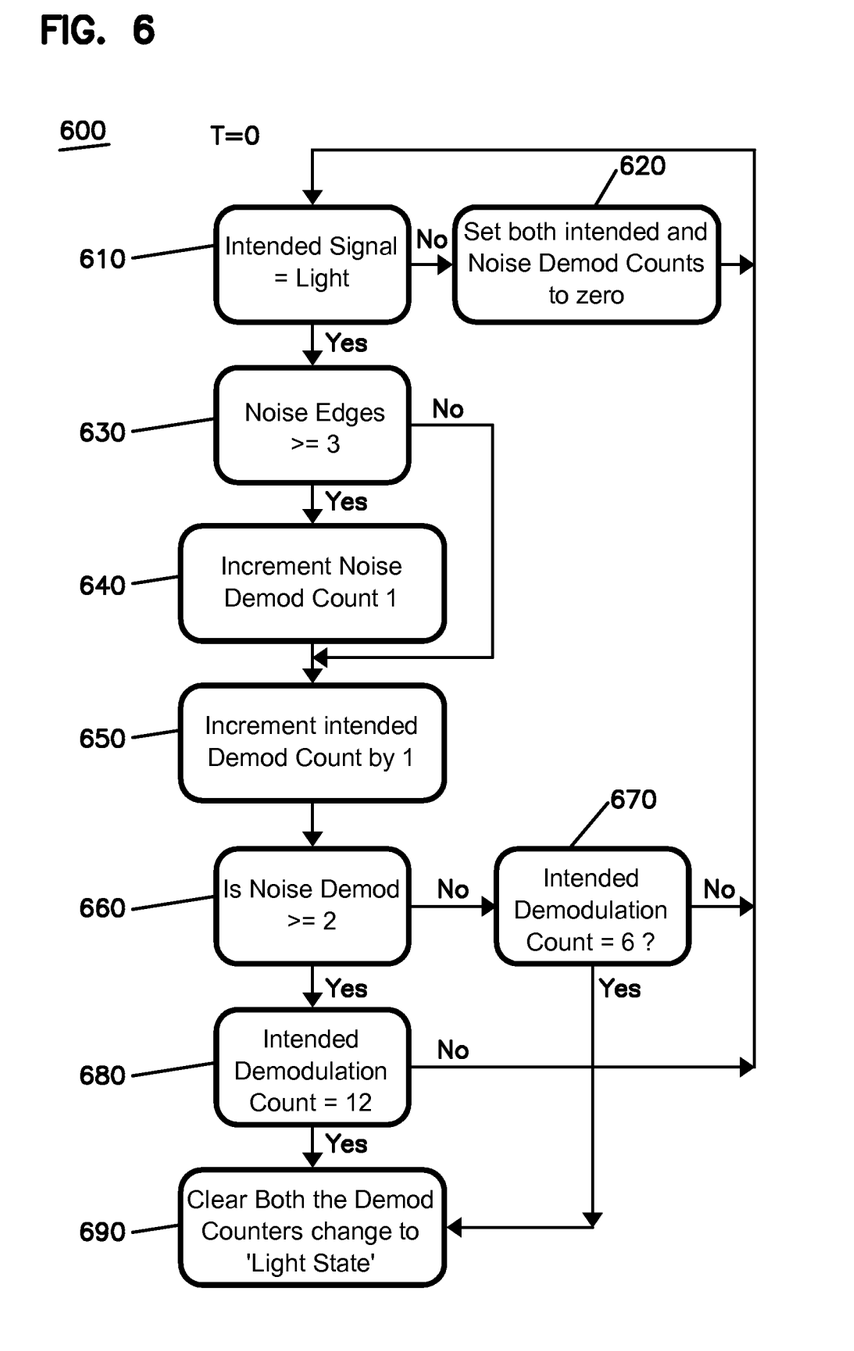
FIG. 6 outlines an example method for determining whether an object is present in a region according to an aspect of the disclosure.

Referring to FIG. 6, an algorithm 600 in an example method for a dark-to-light transition, i.e., determining that an object is present in a monitored region where there was none, is described. After a light pulse is transmitted into the monitored region, the signal received by the sensor is measured to determine (610) if it is above the object detection threshold level 222. If it is not, the process is restarted by resetting the counts for the number of light-pulse-detect pulses 240a ... and for the number of repetition time intervals in which noise has been detected (sometimes referred to as "noise demodulation count"); if the signal received by the sensor is above the object detection threshold level 222, the detection device 100 further determines if the measured noise signal satisfies a certain condition for noise present for the repetition (640). For example, the number of times the noise signal crossed the noise threshold level ("noise edges") can be counted and compared with a predefined number, such as three, in this particular example. If the number of noise edges is at or greater than the predefined number, the noise demodulation count is incremented by one (640), and detection device 100 proceeds to the next step of incrementing the demodulation count by one (650); if the number of noise edges is below the predefined number, and detection device 100 proceeds to step 650 without incrementing the noise demodulation count.

Next, the detection device 100 makes the determination if the noise demodulation count has reached a certain predefined level, such as greater than or equal to a predefined number, such as two (660). If not, the detection device 100 determines whether the demodulation count has reached a lower demodulation count limit n (242), such as six (670); if the noise demodulation count has reached a certain predefined level, the detection device 100 determines whether the demodulation count has reached a higher demodulation count limit n (242), such as twelve (680). In either step 670 or 680, if the demodulation count limit n (242) has not been reached, the process 600 goes back to step 610 for another iteration; if the demodulation count limit n (242) has been reached, the detection device 100 clears both the demodulation count and noise demodulation count and switches to the "light" state, i.e., changes the state of the "light-event" signal 250 for its "dark" state level 252 to its "light" state level 254. The object detection threshold level 220 is also changed to a lower level 224.

The outcome of the algorithm 700 outlined above and in FIG. 6 is that when noise of at least a threshold amount is determined to be not present, the detection device 100 determines that an object is present in the monitored region upon the demodulation count reaching a lower limit than when noise of the threshold amount is determined to be present.

Figure 7:
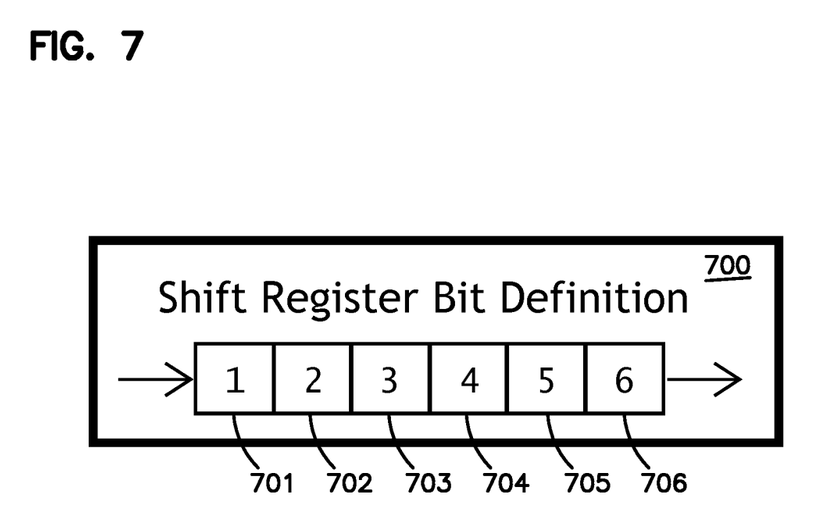
FIG. 7 schematically shows a first-in-first-out (FIFO) shift register for tracking the number of signal measurement time intervals in which the measured signals correspond to a "dark" state, namely, a state in which no object is present in the monitored region according to an aspect of the disclosure.

Referring to FIG. 7, a storage device, such as a register 700 is used in an example process, to be described below in reference to FIG. 8, for light-to-dark transition, i.e., when the monitored region becomes empty from a state where an object has been determined to be present. In this example, the register is a first-in-first-out shift register with a number (seven in this example) of bits. For example, the shift register can be six-bit shift register, with bits 701, 702, ..., 706. In an alternative example, a sixteen-bit shift register can be used. The shift register can be used, for example in the algorithm outlined in below and FIG. 8, to keep track of reflected light detection status of each repetition time interval.

Figure 8:
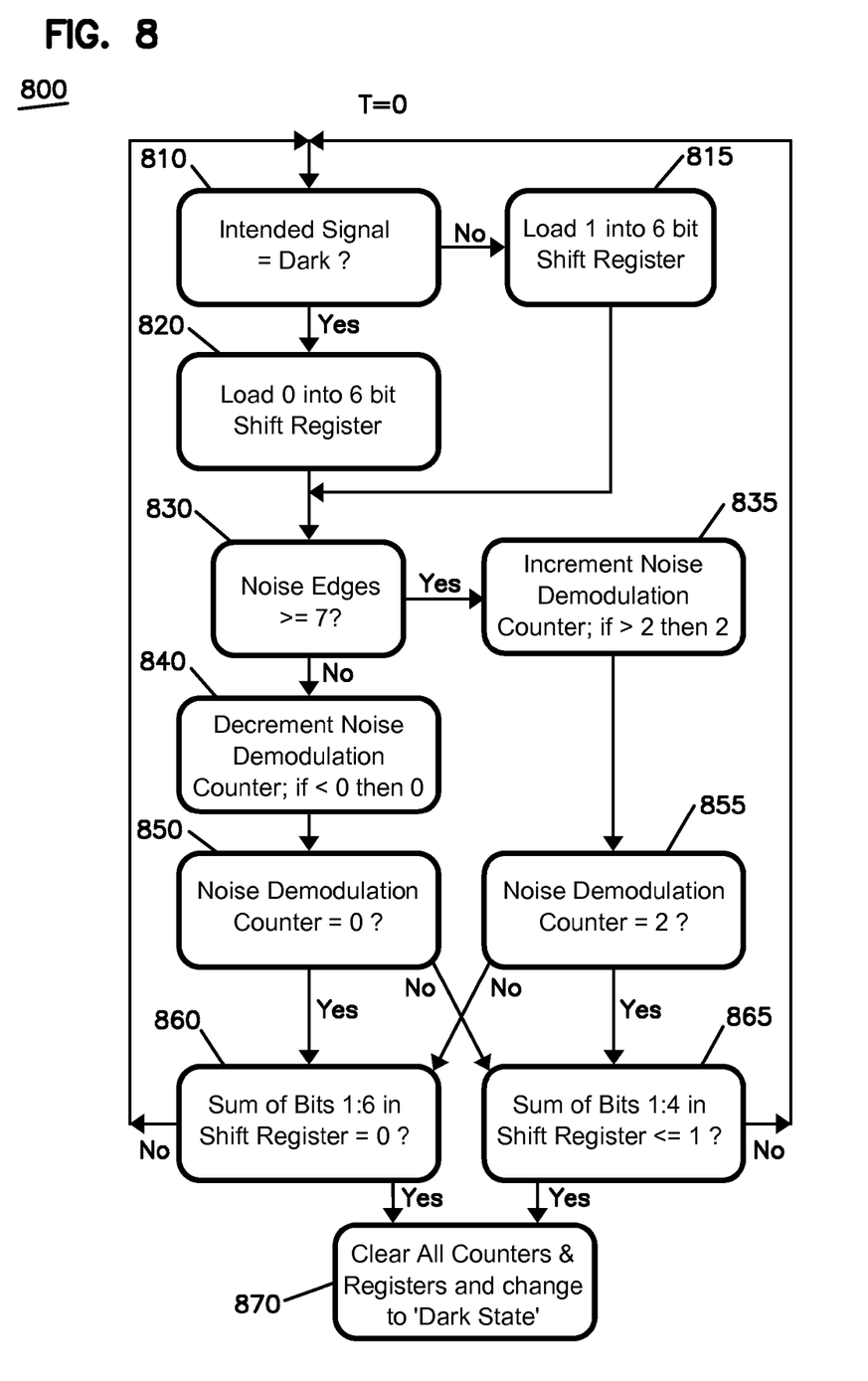
FIG. 8 outlines an example method for determining whether an object is absent from a region according to an aspect of the disclosure.

Referring to FIG. 8, an algorithm 800 in an example method for a light-to-dark transition, i.e., determining that no object is present in a monitored region where an object was present, is described. After a light pulse is transmitted into the monitored region, the signal received by the sensor is measured to determine (810) if it is below the object detection threshold level 224 for the "light" state. If it is not, a "1" is loaded into the shift register 700 (815); if it is, a "0" is loaded in to the shift register 700 (820). In either case, the algorithm 800 proceeds to determining whether a threshold number (e.g., seven) of noise edges have been detected during the noise evaluation window (830). If the threshold number of noise edges have been detected, the noise demodulation counter is incremented by one, but not to above an upper noise demodulation count limit, such as two (835); if the threshold number of noise edges have not been detected, the noise demodulation counter is decremented by one, but not to below a lower noise demodulation count limit, such as zero (840).

Following step 840, the detection device 100 examines if the noise demodulation count is at the lower noise demodulation count limit, such as zero (850). If it is, the detection device 100 determines if the sum of the first l bits of the shift register 700 is at a lower limit, such as zero (860); if the noise demodulation count is not the lower noise demodulation count limit, the detection device 100 determines if the sum of the first l' bits of the shift register 700 is smaller or equal to an upper limit, such as one, where l' is a smaller number than l (865).

Following step 835, the detection device 100 examines if the noise demodulation count is at the upper noise demodulation count limit, such as two (855). If it is, the algorithm proceeds to step 865; if the noise demodulation count is not at the upper noise demodulation count limit, the algorithm proceeds to step 860.

If the sum of the first l bits of the shift register 700 is determined to be at the lower limit, such as zero, in step 860, or if the sum of the first l' bits of the shift register 700 is smaller or equal to an upper limit, such as one, in step 865, the detection device 100 clears both the demodulation count and noise demodulation count and switches to the "dark" state, i.e., changes the state of the "light-event" signal 250 for its "light" state level 254 to its "dark" state level 252. The object detection threshold level 220 is also changed to a higher level 222. Otherwise, the algorithm 800 returns to step 810 for another iteration.

The outcome of the algorithm 800 outlined above and in FIG. 8 is that when noise of at least a threshold amount is determined to be present, the detection device 100 determines that no object is present in the monitored region upon determining that the reflected signal is below the threshold level 224 during a lower number, or fraction, of repetition time intervals than when noise of at least the threshold amount is determined to be not present. In the specific example shown in FIG. 8, if the noise demodulation count reaches 2 at any point, step 865 is reached (i.e., whether the noise demodulation count is 2 presently or not 0 after decrement by 1), the reflected signals for the past four repetition time intervals are examined. If three out of the four are "dark," i.e., below the threshold level 224, the determination that no object is present is made. In contrast, if the noise demodulation count never reaches 2 at any point, step 860 is reached (i.e., whether the noise demodulation count is 0 presently or not 2 after increment by 1), the reflected signals for the past six repetition time intervals are examined. If all six are "dark," i.e., below the threshold level 224, the determination that no object is present is made. The determination that no object is present in the monitored region is thus made upon detecting fewer "dark" reflected signals in a noisy environment.

CONCLUSION

A method and device have been disclosed, wherein the degree of redundancy in reflected signal measurements required for determining whether an object is present in a monitored region is dynamically set based on the noise level detected. For determining that an object is present (dark-to-light) a higher degree of redundancy is used when a threshold level of noise is detected; a lower degree of redundancy is used when a noise level below the threshold level is detected. For determining that no object is present (light-to-dark), a lower degree of redundancy is required in a noisy environment than in a low- or no-noise environment. The reliability of object detection can thus be maintained without resorting to a degree of redundancy for the worst-case scenario.

Because many embodiments of the invention can be made without departing from the spirit and scope of the invention, the invention resides in the claims hereinafter appended.

We claim:

1. An object detection method, comprising:
   transmitting a plurality of signals from a transmitter into a region;
   measuring a plurality of signals, each corresponding to a respective one of the plurality of the transmitted signals, received by a sensor;
   determining whether each of the plurality of received signals satisfies a condition;
   determining whether noise of at least a threshold amount is present; and
   determining whether an object is located within the region depending on whether at least a number of received signals meet the condition, the number being different when noise of at least a threshold amount is determined to be present than not present,
   wherein:
   the transmitting step comprises sequentially transmitting a plurality of optical pulses, during a respective plurality of repetition time intervals, into the region;
   the measuring step comprises measuring each of the plurality of received signals during a signal measurement time interval beginning at or after a starting time of the corresponding transmitted signal;
   the noise determination step comprises measuring noise during a noise measurement time interval in at least one of the repetition time intervals.

2. The method of claim 1, wherein the step of determining whether an object is located within the region comprises determining that the transmitted signals are reflected into the sensor by an object located within the region, or a retro target, when the received signals exceed a first threshold level during at least a number of signal measurement time intervals, the number being a first number when noise is determined to be not present and the number being a second number greater than the first when noise is determined to be present.

3. The method of claim 2, wherein determining that the transmitted signals are reflected into the sensor comprises determining that the transmitted signals are reflected into the sensor when the received signals exceed the first threshold level during at least a number of consecutive signal measurement time intervals.

4. The method of claim 1, wherein the step of determining whether an object is located within the region comprises determining that the transmitted signals are not reflected into the sensor by any object located within the region, or any retro target, when the received signals falls below a second threshold level during at least a number of signal measurement time intervals, the number being a first number when noise is determined to be not present and the number being a second number smaller than the first when noise is determined to be present.

5. The method of claim 4, wherein the noise determination step comprises determining that noise of at least a threshold amount is present when a signal above a noise threshold level is detected in at least a selected number of noise measurement time intervals.

6. The method of claim 5, further comprising determining that a signal above the noise threshold level is detected in a noise measurement time interval when a signal measured in the noise measurement time interval has a level that crosses the noise threshold level at least a selected number of times.

7. The method of claim 5, wherein the step of determining whether an object is located within the region comprises determining that the transmitted signals are not reflected into the sensor when the received signals fall below a second threshold level during at least a number of signal measurement time intervals, the number being a first number when noise is determined to be not present and the number being a second number smaller than the first when noise is determined to be present.

8. The method of claim 1, wherein the noise determination step comprises measuring noise during a noise measurement time interval in each of a plurality of the repetition time intervals.

9. The method of claim 8, wherein the noise determination step comprises determining that noise of at least a threshold amount is present when a signal above a noise threshold level is detected in at least a selected number of noise measurement time intervals.

10. The method of claim 9, further comprising determining that a signal above the noise threshold level is detected in a noise measurement time interval when a signal measured in the noise measurement time interval has a level that crosses the noise threshold level at least a selected number of times.

11. An object detection method, comprising:
transmitting a plurality of signals, each during a respective one of a plurality of sequential repetition time intervals, from a transmitter into a region;
positioning a sensor to receive signals resulting from interactions between the transmitted signals and an object located in the region or a retro target;
measuring a plurality of signals received by the sensor during a respective plurality of signal measurement time intervals, each within a respective repetition time interval;
determining whether each of the plurality of received signals satisfies a condition;
measuring noise during a respective plurality of noise measurement time intervals, each within a respective repetition time interval and being different from any signal measurement time interval;
determining whether the measured noise is present in at least a threshold amount; and
determining whether an object is located within the region depending on whether the received signals satisfy the condition during at least a number of repetition time intervals, the number being different when noise of at least a threshold amount is determined to be present than not present.

12. The method of claim 11, wherein the step of measuring noise comprises measuring signals received by the sensor during the plurality of noise measurement time intervals.

13. The method of claim 11, wherein:
the step of determining whether each of the plurality of received signals satisfies a condition comprises determining, after determining that the transmitted signals are not reflected into the sensor, whether each of the plurality of received signals is above a first threshold level during the signal measurement time interval; and
the step of determining whether an object is located within the region comprises determining that the transmitted signals are reflected into the sensor when the received signals during the respective signal measurement time intervals are above the first threshold level during at least a number of repetition time intervals, the number being higher when noise of at least a threshold amount is determined to be present than not present.

14. The method of claim 11, wherein:
the step of determining whether each of the plurality of received signals satisfies a condition comprises determining, after determining that the transmitted signals are reflected into the sensor, whether each of the plurality of received signals is below a second threshold level during the signal measurement time interval; and
the step of determining whether an object is located within the region comprises determining that the transmitted signals are not reflected into the sensor when the received signals during the respective signal measurement time intervals are below the second threshold level during at least a number of repetition time intervals, the number being smaller when noise of at least a threshold amount is determined to be present than not present.

15. The method of claim 14, further comprising determining that a signal above the noise threshold level is detected in a noise measurement time interval when a signal measured in the noise measurement time interval has a level that crosses the noise threshold level at least a selected number of times.

16. The method of claim 11, wherein the step of determining whether the measured noise is present in at least a threshold amount is present comprises determining that noise is present in at least a threshold amount is present when a signal above a noise threshold level is detected in at least a selected number of noise measurement time intervals.

17. An object detecting device, comprising:
a signal transmitter adapted to transmit signals into a region;
a signal sensor positioned and adapted to receive signals resulting from interactions between the transmitted signals and an object located in the region, or a retro target, and adapted to generate an output correlated to the received signals;
a signal comparator adapted to compare the output of the signal sensor with a reference signal corresponding to a threshold level, and generate an output indicative of the relative levels between the output of the signal sensor and the reference signal;
a noise detector; and
a controller adapted to:
operate the transmitter to transmit a plurality of signals, each during a respective one of a plurality of sequential repetition time intervals, into a region;
operate the comparator to compare, during a respective plurality of signal measurement time intervals, each within a respective repetition time interval, a plurality of signals generated by the sensor with the reference signal;
operate the noise detector to measure noise during a respective plurality of noise measurement time intervals, each within a respective repetition time interval and being different from any signal measurement time interval;

determine whether the measured noise is present in at least a threshold amount is present; and determine:

that the transmitted signals are reflected into the sensor when the output of the comparator indicates that the received signals are above the threshold level at least a number of repetition time intervals, the number being larger when noise of at least a threshold amount is determined to be present than not present, or that the transmitted signals are not reflected into the sensor when the output of the comparator indicates that the received signals are below the threshold level at least a number of repetition time intervals, the number being smaller when noise of at least a threshold amount is determined to be present than not present.

18. The device of claim 17, wherein the noise detector comprise a noise comparator adapted to compare the output of the signal sensor with a reference signal corresponding to a threshold noise level, and generate an output indicative of the relative levels between the output of the signal sensor and the reference signal.

19. The device of claim 18, where in the threshold noise level is lower than the threshold level for determining that an object is present within the region.

* * * * *